July 5, 1960
F. J. HANBACK
2,943,868
SWIVEL CLUSTER COUPLING
Filed Sept. 17, 1956
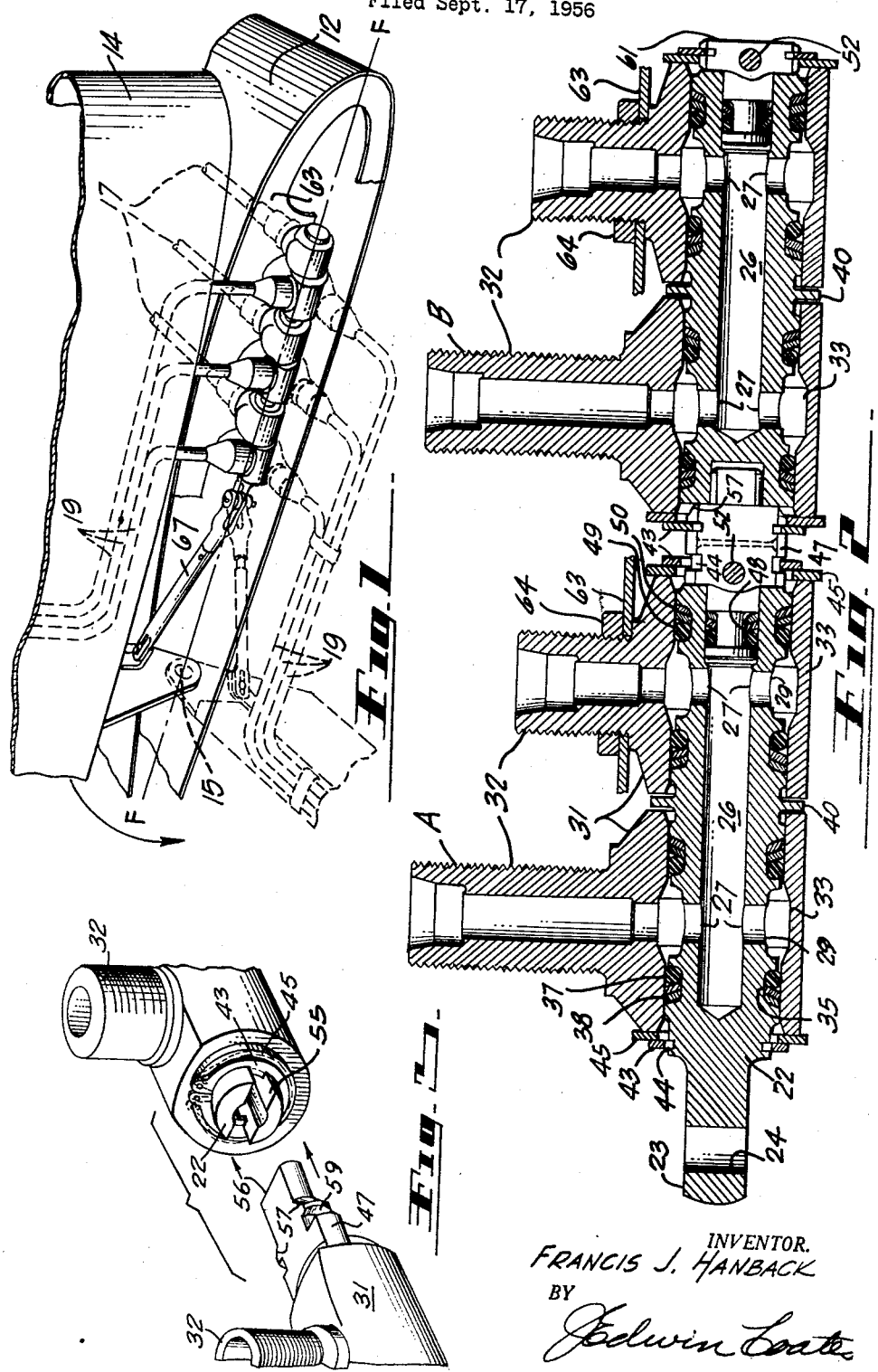
INVENTOR.
FRANCIS J. HANBACK
BY
ATTORNEY.

United States Patent Office 2,943,868
Patented July 5, 1960

2,943,868
SWIVEL CLUSTER COUPLING

Francis J. Hanback, Palos Verdes Estates, Calif., assignor to Douglas Aircraft Company, Inc., Santa Monica, Calif.

Filed Sept. 17, 1956, Ser. No. 610,221

10 Claims. (Cl. 285—62)

This invention relates to fluid conduit couplings and more particularly to couplings permitting relative motion between or among the conduits joined.

In the present extensive use of pressurized gas and liquid as a means for the transmittal of power between a source of energy and a point of power utilization, there is frequently encountered the necessity of transmitting the power across an articulated joint. In accommodating this requirement various means have been adapted, among the more economical and less complex of which is the use of a section of flexible tubing across the joint. In some restricted applications this means is acceptable but the degree of articulation, the nature of the fluid, and the operating pressures impose a strict limitation on the extent of use of the flexible tubing. A more acceptable means of transversing the articulated joint is found in the use of the swivel coupling which, although more expensive, can withstand the same degree of pressure as the tubing which it connects, is not subject to the corrosive effects of fluids, is unlimited in degree of angular displacement and is no more subject to age deteriorization than any other components of the fluid system.

Although the advent of the swivel coupling provided a solution to numerous pre-existing problems, by its very nature it created new problems which, though less serious, still rendered the vicinity of the joint among the weaker links in the pressure system. The presence of a high pressure fluid in a coupling demands tight seals to prevent the leakage of fluid therepast and this unavoidably results in high friction in the swivels. Heretofore, the torque to oscillate the swivel coupling was imparted thereto directly through the connected conduits. After repeated cycles of operation under these conditions fatigue failure in the conduits, usually at the point of juncture with the coupling, becomes a potentially dangerous factor.

It is a feature of this invention, in the broadest aspect thereof, that there is provided a driving means for a swivel fitting whereby angular motion is imparted to swivel in such a manner that the conduits connected are not subjected to any forces other than the pressure of the fluid passing therethrough. This feature is accomplished, in the case of a swivel coupling incorporating plural sleeve-like parts each connected to one of the conduits to be joined and a common communicating pivot stem on which the sleeve-like parts are swiveled, by the use of an actuating drive rod attached to one end of the stem. When installed, one of the sleeves is rigidly attached to a fixed portion of associated structure with the axis of the stem coincident with the pivot axis between the first and a second structure across which the pressurized fluid is to be conducted. Examples of such pivotally connected structures are vehicle chassis and running gear supports, aircraft frames and retractable landing gear or folding wings and others. The second sleeve is fluid connected to a conduit leading to or from an instrumentality, such as a piston-cylinder unit, on the relatively movable structure. By also attaching the free end of the drive rod to the moving structure at a point laterally adjacent the pivot axis, it will be seen that the stem and the second sleeve will move in unison and substantially all the torque required to overcome the friction between the first sleeve and the stem will be absorbed by the drive rod. In this manner the conduits will be relieved of bending strains and the possibility of fatigue or other flexural failure will be substantially eliminated.

While it is recognized that an alternate manner of relieving the fluid conduits from strain would be in attaching the drive rod directly between the moving sleeve and the moving structure, no particular greater advantage would be afforded thereby but rather such arrangement would render the organization less universal in application. It is for this reason that the swivel cluster employing a driven stem is shown herein as the preferred embodiment.

In the aircraft field among the various models of folding wing craft there is wide variation in the number of hydraulic lines which must be carried across the folding axis. By the arrangement of parts constituting this invention provision is made whereby multiple units can be placed in interlocking side-by-side relationship and a single operating rod utilized to effect motion of all stems. It will thus be appreciated that even though the first unit includes a vital element, the drive rod, over and above the quantity of parts present in heretofore known swivel fittings, all fittings in excess of one require no greater space than others yet all are caused to function in the more desirable manner.

Although in the accompanying preferred showing of the invention certain isolated features, such as the sealing arrangement and phases of the fluid transfer path, are known in the art, the employment of such known features along with the presented innovations results in the enhancement of the entire organization with mutual benefits flowing between the old and the new.

Other advantages, features and applications of the invention will become apparent as an understanding of the preferred form is obtained from the accompanying description taken in conjunction with the related drawings in which:

Figure 1 is a fragmentary perspective view of a plurality of the couplings utilized at the hinge line of the folding wing of an aircraft;

Figure 2 is a side sectional view of a pair of the couplings in interlocking relation; and Figure 3 is a perspective view of a pair of couplings showing the manner in which interlock therebetween is accomplished.

Now with reference to the drawings, wherein like reference numbers represent identical parts, and more particularly Figure 1 thereof, there is shown the main or fixed portion 12 and the folding portion 14 of a wing of the folding type for aircraft. These portions 12 and 14 pivot with respect to each other about the axis F—F being so constrained by hinge 15 and others which have been omitted for the purpose of clarity. Extending inwardly toward the aircraft fuselage (not shown) within inboard wing portion 12 are a series of ducts 17 which, by way of example, may lead to hydraulic pumps or other sources of pressurized fluids, it being understood that such fluid could be gaseous or liquid. In the outboard or folding portion 14 of the wing are a second series of ducts or conduits 19 which are to be placed in respective communication with ducts 17 of the first series. It is the function of the couplings of this invention to effect this result.

Viewing Figure 2 it is seen that the left swivel unit includes a main stem 22 having a laterally extending driving finger 23 with an opening 24 transversely therethrough. The stem 22 is drilled longitudinally to provide a fluid passage 26 axially thereof. At predetermined spaced intervals radial ports 27 communicate passage 26 with the exterior of stem 22 and at the point of exit of ports 27 stem 22 is circumferentially channeled at 29 for purposes set out hereinafter. Swiveled about stem 22 are a pair of sleeves 31, 31 each having a ducted, externally threaded extension 32 thereon being adapted for connection with fluid conduits or tubes 17 or 19. The inner end of the duct which extends through extension 32 is outwardly adjacent channel 29 and is thereby in fluid conducting relation with passage 26 through port 27. The interior of sleeve 31 may be relieved as at 33 to complement channel 29. As a means of preventing leakage of fluid axially of stem 22 past sleeve 31, annular grooves 35 are formed in stem 22 on either side of channel 29. Within grooves 35 are sealing O-rings 37 of a resilient material such as rubber and suitable backup rings 38 to prevent extrusion of the O-rings 37 between sleeve 31 and stem 22 upon application of high pressure to fluid in the assembly. By the employment of the annular channel 29, the passage through extension 32 will be fluid connected to the interior of stem 22 regardless of the angular position of sleeve 31.

For the purpose of brevity the letters A and B have been used in Figure 2 and will hereafter be used to respectively designate the left and right hand swivel assemblies each comprising a common stem 22 and two swivel sleeves 31.

The adjacent ends of the pairs of sleeves 31 in each of assemblies A and B are in bearing engagement with a flange 40 on stem 22, the flange 40 also restraining motion of the sleeves 31 in one direction axially of stem 22. The left sleeve, viewing Figure 2, in each of A and B is retained on stem 22 by a snap-ring 43 seating within circumferential groove 44. To reduce friction between snap-rings 43 and sleeves 31 when the latter are swivelled, a plain thrust bearing 45 is interposed therebetween.

In the right end of bore 26 in assembly A is affixed a combination plug and drive member 47. The left or plug end of member 47 is circular in cross-section and is relieved as at 48 for the accommodation of sealing O-ring 49 and cooperating backup rings 50. Pin 52 passes through aligned openings in member 47 and the extremity of stem or core 22 and serves thereby to secure the plug end of member 47 in passage 26 and prevent passage of fluid therepast. Snap ring 43 seating in groove 44 and bearing 45 retain the right sleeve 31 on stem 22 in a manner similar to that by which left sleeve 31 is retained.

Now viewing Figure 3 in conjunction with Figure 2 the means by which motion of stem 22 in assembly A is transmitted to the stem 22 in assembly B will be seen and now described. Stem 22, assembly B, rather than being provided with a drive finger as is the stem 22 in assembly A, is slotted as at 55 or may be provided with any other configuration of a non-circular opening. For mating engagement with slot 55 member 47 has a complementary extension 56 with a stepped down extremity extending from a tapered surface 57. Inwardly of surface 57 there is formed a groove 59 for the reception of snap-ring 43. When extension 56 is inserted in slot 55 the tapered surfaces 57 serve to spread snap ring 43 and as the extension 56 is farther inserted snap ring 43 will spring into groove 59 to lock adjacent stems 22, 22 together. Being non-circular in configuration mating extension 56 and slot 55 will transmit axial rotary motion between the stems 22, 22.

The right end passage 26 in stem 22 (assembly B) is closed by a plug 61 similar in construction to the plug end of member 47. It will be noted in Figure 2 that retainer pin 52 is maintained in position by the encircling thereof by snap ring 43 and bearing 45.

Although in Figure 2 there are shown only two swivel assemblies it is to be understood that in use any number of additional such assemblies can be interlockingly associated in the same manner as assemblies A and B are joined. Moreover it will be apparent that, should it be desired to intercommunicate three or more fluid conduits, stem 22 could be elongated to accommodate additional sleeves, there being the obvious requirement of additional radial bores, circumferential channels and other adjuncts.

In installing the swivel assemblies or clusters the extension 32 on one of each pair of sleeves 31 is positioned through the preformed opening in wing bracket 63 and is fixed thereat by means of a nut 64 threaded over extension 32. Conduits 17 and 19 are respectively joined to extensions 32 by the use of any desired conventional couplings.

In order to rotate stems 22 when wing panels 12 and 14 are moved relatively to each other a drive rod 67 is connected at one end to stem finger 23. The other end of drive rod 67 is pinned to any convenient point on the moving wing panel 14, the only requirement being that such point of attachment is laterally spaced from folding axis F—F. With the assembly installed, upon the folding of the wing the stems 22 will be rotated by drive rod 67 to the same angular extent and at the same rate as sleeves 31 connected to conduits 19 are required to move. Thus there will be no relative motion between such parts resulting in the absence of bending loads in conduits 19 and as the sleeves 31 which join with conduits 17 are anchored to bracket 63 all forces on such sleeves 31 will not be transmitted to conduits 17.

While the preferred embodiment of the invention is herein shown and described it is capable of variations which will occur to those familiar in art. As for example, to more equally distribute torque loads in the stems 22 by a simple modification of plug 52, a second drive rod could be used to drive the stems 22 either alone or in addition to the drive rod 67 at the opposite end of the assembly. Further should it be desired to space adjacent swivel assemblies farther apart, the interconnecting plug-drive member 47 could be elongated. These and other modifications are susceptible to incorporation in the invention and it is to be understood that such are within the purview of the spirit of the invention as defined in the appended claims.

I claim:

1. An aircraft wing structure having parts thereof moveable relative to each other about a pivot axis and having fluid lines on each part leading toward said axis; a longitudinally extending, internally ducted stem mounted on an axis coincident with said pivot axis; at least a pair of sleeves in fluid tight engagement on the stem and being swivelled thereon for motion about the stem axis; a bracket on one of the relatively moveable parts, one of said sleeves being fixed to said bracket and connected to a fluid line on said one of the parts, the other of said sleeves being connected to a fluid line on the other of said relatively moveable parts and each of said sleeves also including a flow passage between its associated fluid line and the internal duct in the stem whereby the fluid lines are communicated with each other; and a torque applying rod attached at one of its ends to an end of the stem; the other end of the torque rod being attached to the other of said relatively moveable parts at a point spaced laterally of the pivot axis whereby upon relative motion of the relatively moveable parts the stem is rotated to eliminate bending strains in the fluid lines.

2. In structure having parts thereof moveable relative to each other about a pivot axis and having fluid lines on each part leading toward said axis, fluid coupling means adapted to connect the lines across the pivot axis comprising: a longitudinally extending, internally ducted stem mounted on an axis coincident with said pivot axis; at least a pair of sleeves in fluid tight engagement on the stem communicating with the duct in the stem and being swivelled thereon for motion about the stem axis, each of said sleeves including means for flow connection with one of the fluid lines; a bracket on one of the relatively moveable parts, one of said sleeves being fixed to said bracket and connected to a fluid line on said one of the parts, the other of said sleeves being connected to a fluid line on the other of said relatively moveable parts; a torque applying rod attached at one of its ends to an end of the stem, the other end of the torque rod being attachable to the other of said relatively moveable parts at a point spaced laterally of the pivot axis whereby upon relative motion of the relatively moveable parts the stem is rotated to eliminate bending strains in the fluid lines; a second fluid coupling means similar to the first said coupling means axially adjacent the first said coupling means; and means interconnecting both said coupling means effecting movements thereof in unison.

3. Structure having parts thereof moveable relative to each other about a pivot axis and having fluid lines on each part leading toward said axis, a plurality of fluid coupling means adapted to connect the lines across the pivot axis, each of said plurality including a longitudinally extending, internally ducted stem mounted on an axis coincident with said pivot axis; at least a pair of sleeves in fluid tight flow communication with each other through the duct in the stem and being swivelled thereon for motion about the stem axis, each of said sleeves including means for flow connection with one of the fluid lines, one of said sleeves being fixed to one of said parts and connected to a fluid line on said one of said parts, the other of said sleeves being connected to a fluid line on the other of said relatively moveable parts; a torque applying rod attached at one of its ends to an end of the stem of one of the couplings, the other end of the torque rod being attached to the other of said relatively moveable parts laterally of the pivot axis whereby upon relative motion of the relatively moveable parts the stem is rotated to eliminate relative motion between the stem and the other of said sleeves; and means interconnecting the plurality of coupling means to effect simultaneous motion of all stems.

4. In structure having parts thereof moveable relative to each other about a pivot axis and having fluid lines on each part leading toward said axis, fluid coupling means adapted to connect the lines across the pivot axis comprising: a longitudinally extending, internally ducted stem mounted on an axis coincident with said pivot axis; at least a pair of sleeves in fluid tight engagement on the stem and being swivelled thereon for motion about the stem axis, each of said sleeves including means for connection with one of the fluid lines; a bracket on one of the relatively moveable parts, one of said sleeves being fixed to said bracket and connected to a fluid line on said one of the parts, the other of said sleeves being connected to a fluid line on the other of said relatively moveable parts and each of said sleeves flow communicating its associated fluid line with the internal duct in the stem whereby the fluid lines are communicated with each other; a torque applying rod attached at one of its ends to the stem, the other end of the torque rod being attached to the other of said relatively moveable parts at a point spaced laterally of the pivot axis whereby upon relative motion of the relatively moveable parts the stem is rotated to the same extent as required of the other of said sleeves to eliminate bending strains in the fluid lines; lock means preventing motion of the sleeves axially of the stem; a second fluid coupling means adjacent the first said coupling means and interconnected therewith, the lock means further serving to secure the first and second said coupling means from separation.

5. A swivel cluster coupling comprising: a first longitudinally extending stem having a central fluid passage therein and having radial ports at spaced points communicating the passage with the exterior of the stem; hollow sleeves each with a ducted extension thereon for attachment to a fluid conduit, one of said sleeves encircling said stem at the locus of exit of each spaced radial port and being rotatable about the stem; retainer means maintaining the sleeves on the stem against motion along the axis of the stem; means for communicating each radial port with the associated ducted extension on the sleeve at all angular positions of the sleeve; means including a drive rod connected to one end of the stem for imparting motion thereto about the longitudinal axis of the stem; at least a second stem in axial alignment with the said first stem, said second stem also having thereon and therein a fluid passage, radial ports and hollow sleeves having the same relation thereto as in the said first stem; and interacting means between the first and second stems to transmit axial rotary motion therebetween, whereby rotary motion imparted to the first stem by the drive rod will be imparted to the second stem, said interacting means cooperating with one of said retainer means to hold the first and second stems against relative motion axially of the stems.

6. A swivel cluster coupling comprising: a first longitudinally extending stem having a central fluid passage therein and having radial ports at spaced points communicating the passage with the exterior of the stem; hollow sleeves each with a ducted extension thereon for attachment to a fluid conduit, one of said sleeves encircling said stem at the locus of exit of each spaced radial port and being rotatable about the stem; retainer means maintaining the sleeves on the stem against motion along the axis of the stem; means for communicating each radial port with the associated ducted extension on the sleeve at all angular positions of the sleeve; means including a drive rod connected to one end of the stem for imparting motion thereto about the longitudinal axis of the stem; at least a second stem in axial alignment with the said first stem, said second stem also having thereon and therein a fluid passage, radial ports and hollow sleeves having the same relation thereto as in the said first stem; and interacting means between the first and second stems to transmit axial rotary motion therebetween, whereby rotary motion imparted to the first stem by the drive rod will be imparted to the second stem, said interacting means including a plug for closing one end of the central fluid passage and a non-circular extension adapted for mating engagement in complimentary non-circular opening in the said second stem.

7. A swivel cluster coupling comprising: a first longitudinally extending stem having a central fluid passage therein and having radial ports at spaced points communicating the passage with the exterior of the stem; hollow sleeves each with a ducted extension thereon for attachment to a fluid conduit, one of said sleeves encircling said stem at the locus of exit of each spaced radial port and being rotatable about the stem; sealing means between the stem and the sleeve precluding fluid leakage therebetween; retainer means maintaining the sleeves on the stem against motion along the axis of the stem; means for communicating each radial port with the associated ducted extension on the sleeve at all angular positions of the sleeve; means including a drive rod connected to one end of the stem for imparting rotary motion thereto about the longitudinal axis of the stem; at least a second stem in axial alignment with the said first stem, said second stem also having thereon and therein a fluid passage, radial ports and hollow sleeves having the same relation thereto as in the said first stem; and interacting means between the first and second stems to transmit axial rotary motion therebetween, whereby rotary motion imparted to the first stem by the drive rod will be imparted to the second stem.

8. A swivel cluster coupling comprising: a first longitudinally extending stem having a central fluid passage therein and having radial ports at spaced points communicating the passage therein the exterior of the stem; hollow sleeves each with a ducted extension thereon for attachment to a fluid conduit, one of said sleeves swivelled on said stem at the locus of exit of each spaced radial port with the ducted extension communicating with the port; retainer means maintaining the sleeves on the stem against motion along the axis of the stem; means including a drive rod connected to one end of the stem for imparting motion thereto about the longitudinal axis of the stem; at least a second stem in axial alignment with the said first stem, said second stem also having thereon and therein a fluid passage, radial ports and hollow sleeves having the same relation thereto as in the said first stem; and interacting means between the first and second stems to transmit axial rotary motion therebetween, whereby rotary motion imparted to the first stem by the drive rod will be imparted to the second stem, said interacting means cooperating with one of said retainer means to hold the first and second stems against relative motion axially of the stems.

9. A swivel cluster coupling comprising: a longitudinally extending stem having a central fluid passage therein and having radial ports at spaced points communicating the passage with the exterior of the stem; hollow sleeves each with a ducted extension thereon for attachment to a fluid conduit, one of said sleeves being swivelled on said stem at the locus of exit of each spaced radial port with the ducted extension communicating with the port; retainer means maintaining the sleeves on the stem against motion along the axis of the stem; and means including a drive rod connected at one of its ends to one end of the stem the drive rod extending laterally away from the axis of the stem whereby rotation will be imparted to the stem when a force about said axis is applied to the other end of the drive rod about the longitudinal axis of the stem.

10. Aircraft wing structure having parts thereof moveable relative to each other about a pivot axis, and having fluid lines on each part leading toward said axis; fluid coupling means adapted to connect the lines across the pivot axis including a longitudinally extending, internally ducted stem mounted on an axis coincident with said pivot axis; at least a pair of sleeves in fluid tight engagement on the stem and being swivelled thereon for motion about the stem axis, each of said sleeves including means for connection with one of the fluid lines and providing flow communication between its associated fluid line and the internal duct in the stem; a bracket on one of the relatively moveable parts, one of said sleeves being fixed to said bracket and connected to a fluid line on said one of the parts, the other of said sleeves being connected to a fluid line on the other of said relatively moveable parts; a torque applying rod attached at one of its ends to an end of the stem, the other end of the torque rod being attached to the other of said relatively moveable parts at a point spaced laterally of the pivot axis whereby upon relative motion of the relatively moveable parts the stem is rotated to eliminate bending strains in the fluid lines; a second fluid coupling similar to the first said fluid coupling; and means maintaining the first and second said fluid coupling in axial spaced apart relation and interlocking the stems for movement in unison.

References Cited in the file of this patent

UNITED STATES PATENTS 2,736,515    Dolan  ---------------- Feb. 28, 1956

FOREIGN PATENTS

832    Switzerland ------------ Apr. 8, 1889